United States Patent [19]

Pensak et al.

[11] 3,876,759

[45] Apr. 8, 1975

[54] METHOD OF MAKING CLEAR LEMON-FLAVORED MOUTHWASH

[75] Inventors: Philip Pensak, New Brunswick; Michael J. Falkiewicz, Flemington, both of N.J.

[73] Assignee: Colgate-Palmolive Company, New York, N.Y.

[22] Filed: Jan. 4, 1973

[21] Appl. No.: 320,856

[52] U.S. Cl. .................................................. 424/58
[51] Int. Cl. .............................................. A61k 7/16
[58] Field of Search .............................. 424/49–58

[56] References Cited
UNITED STATES PATENTS
3,342,687   9/1967   Gould .................................. 424/57

Primary Examiner—Richard L. Huff
Attorney, Agent, or Firm—Herbert S. Sylvester, Esq.; Murray M. Grill, Esq.; Kenneth A. Koch, Esq.

[57] ABSTRACT

Clear lemon-flavored mouthwash compositions are prepared by mixing a blend of lemon oil, emulsifier, and alcohol with water.

3 Claims, No Drawings

3,876,759

METHOD OF MAKING CLEAR LEMON-FLAVORED MOUTHWASH

The invention pertains to methods for producing liquid mouthwash formulations and the resulting products. More specifically, the invention relates to a method for making a visually clear, stable, aqueous mouthwash product containing a suitable lemon flavoring ingredient, typically lemon oil, and a nonionic emulsifier.

To obtain consumer acceptance, a mouthwash formulation must have a pleasant flavor. The use of certain specific flavoring ingredients, such as lemon oil for example, may introduce stability and/or compatibility problems in an aqueous mouthwash-composition.

The use of lemon oil flavoring in such compositions may result in a hazy product or in the settling out of certain components during storage. These undesirable characteristics of a lemon oil flavored aqueous mouthwash may be due to the presence of a high percentage of non-polar terpene components in lemon oil. It is a primary advantage of the present invention to provide a method for formulating a lemon oil flavored mouthwash that results in a clear, stable product. A further advantage of the invention is to define a pH range for aqueous lemon oil containing mouthwash compositions wherein the unpleasant tasting products of the natural degradation of lemon oil are minimized.

The mouthwash composition according to the invention typically contains from about 60 to about 95%, preferably 70 to 80%, e.g., about 75% by weight water and from about 0 to about 25%, preferably 5 to 25%, e.g., about 15% by weight of a non-toxic alcohol such as isopropanol and ethanol. The alcohol component of the mouthwash preferably utilized denaturing components which also function as flavoring agents. These materials are exemplified by the following materials: anethol, anise oil, bay oil (cyrcia oil), benzaldehyde, bergamot oil, bitter almond oil, camphor, cedar leaf oil, chlorothymol, cinnamic aldehyde, cinnamon oil, citronella oil, clove oil, coal tar, eucalyptol, eucalyptus oil, eugenol, guaiacol, lavender oil, menthol, mustard oil, peppermint oil, phenol, phenyl salicylate, pine oil, pine needle oil, rosemary oil, sassafras oil, spearmint oil, spike lavender oil, storax, thyme oil, thymol, tolu balsam, turpentine oil, wintergreen oil and boric acid. The denaturing agents are typically present in an amount between about 1 and 2% of the total alcohol content of the mouthwash.

The lemon oil flavoring component is preferably derived from the rind of lemons by methods well known in the art. The lemon oil component of the formulation is present in an amount from about 0.01 to about 1%, typically from 0.05 to 1.0%, more preferably about 0.1 to 0.5%, e.g., 0.2% by weight depending on the flavoring effect desired. Of course, an equivalent synthetic lemon oil component may be used if desired.

As disclosed in U.S. Pat. No. 3,639,563, mouthwash formulations are conventionally formulated by mixing the alcohol-soluble components in a suitable mixing apparatus to form an alcohol solution. Subsequently, water and water-soluble components are added to the mixing apparatus containing the alcohol solution and the entire contents blended to form the final mouthwash product. The foregoing prior art process has the primary advantage of employing a single mixing tank.

In accordance with a specific aspect of the invention, a method for preparing lemon flavored mouthwash products that are visually clear and stable is provided. The method of the invention includes the step of forming a premix of at least the emulsifier and lemon oil ingredients, preferably also including the alcohol component, and subsequently adding the premix to the formula amount of water or water solution in a mixing tank. The water solution can contain any or all of the water-soluble ingredients of the formulation, or they may be added after the premix is combined with the water. Similarly, the premix can contain all the alcohol-soluble components of the formulation or alcohol-soluble ingredients other than the lemon oil and emulsifier can be subsequently added after the premix is combined with the water.

Pursuant to the process of the invention, a clear and stable lemon flavored mouthwash can be formulated with a wide varieity of polymeric polyoxyethylene containing nonionic emulsifiers for the lemon oil component, including polyoxyethylene-polyoxypropylene copolymers, polyoxyethylene derivatives of sorbitan fatty acid esters, and polyoxyethylene condensates with alkylphenols, e.g., nonylphenol condensed with about 10 moles of ethylene oxide.

Representative polymeric polyoxyethylene containing nonionic surface-active agents, which include solid and paste materials are:

1. Polyoxypropylene-polyoxyethylene block polymers having the formula $HO(CH_2CH_2O)_a(CH(CH_3)CH_2O)_b(CH_2CH_2O)_cH$, wherein $a$, $b$ and $c$ are integers reflecting the respective polyethylene oxide and polypropylene oxide blocks of said polymer. The polyoxyethylene component of said block polymer constitute at least about 40% by weight of said block polymer molecule. The polyoxypropylene hydrophobic portion of the molecule preferably has a molecular weight of between about 1,000 and 4,000. These materials are well know in the art and are available under the trademark "Pluronics." The Pluronic materials described herein include F 68, P 65, P 105, L 44, P 104, F 98, F 108 and F 127.

2. Polyoxyethylene derivatives of sorbitan mono-, di- and tri- fatty acid esters wherein the fatty acid component has between 12 and 24 carbon atoms. The preferred polyoxyethylene derivatives are of sorbitan monolaurate, sorbitan monopalmitate, sorbitan monostearate, sorbitan monoisostearate, sorbitan tristearate, sorbitan monooleate, and sorbitan trioleate. The polyoxyethylene chains contain between about 4 and 30 ethylene oxide units, and preferably about 20. The sorbitan ester derivatives contain 1, 2 or 3 polyoxyethylene chains dependent upon whether they are mono-, di-, or tri-acid esters.

The surfactant component of the new formulation should be present in an adequate amount to completely emulsify the lemon oil flavoring component to produce a clear, stable product. The concentration of emulsifier is typically from about 0.1 to 5% of the formulation depending on the alcohol content and lemon oil concentration. The amount of surfactant should be greater for higher amounts of lemon oil flavoring component and less for smaller amounts of lemon oil.

The new method is particularly advantageous when lemon oil flavoring and Pluronic emulsifiers are employed and a visually clear and stable product is desired. When conventional formulation methods are used in a lemon oil-Pluronic emulsifier system, a hazy product with insoluble and settleable particles is obtained.

The mouthwash composition preferably contains glycerine in amounts up to about 15%, with compositions containing between about 8 and 12% having particularly desirable characteristics. The glycerine functions as a sweetener, supplies "body" to the compositions and a "velvety" feel in the mouth. It may be replaced in whole or in part by such equivalent materials as sorbitol or propylene glycol.

The mouthwash composition may also optionally contain small effective amounts of antibacterial agents such as the quaternary ammonium compounds and the substantially saturated aliphatic acyl amides. Preferred additions of these agents are in amounts between about 0.01 and 0.1%. The following are illustrative of useful antibacterial agents: benzethonium chloride, diisobutyl phenoxy ethoxy ethyl dimethyl benzyl ammonium chloride, N-alkylpyridinium chloride, N-cetyl pyridinium bromide, sodium N-lauroyl sarcosine, sodium N-palmitoyl sarcosine, lauroyl sarcosine, N-hyristoyl glycine and potassium N-lauroyl sarcosine.

The mouthwash composition will usually also contain adjuvant materials to provide color, additional flavoring, if desired, and sweetening effects. Color is typically added in an amount up to about 0.01%. Additional flavorant, such as citric acid, or sweetener, such as saccharin, is preferably added in small amounts from about 0.01 to about 0.1%, typically about 0.05%.

Pursuant to a further specific aspect of the invention, the pH of the mouthwash formulation is adjusted to from about 3.5 to about 7.0, preferably from about 5 to 6, by the inclusion of a buffering material. By providing the mouthwash with a pH from about 3.5 to about 7.0, preferably from about 5 to about 6, it has been found that the products formed by natural degradation of the lemon oil component due to oxidation catalyzed by sunlight are surprisingly not as unpleasant tasting as those found in an equivalent formulation having a pH below about 3.5. The buffering ingredient can be any suitable alkaline material that does not adversely affect the flavor of the formulation.

Pursuant to the invention, a sufficient amount of the buffering ingredient to raise the pH of the formulation to the desired level, preferably between about 5 and 6, may be included in the lemon oil containing mouthwash. Typically, the buffering ingredient is present in an amount from about 0.1 to about 1.0% by weight, preferably about 0.5%. Suitable buffering materials are alkali metal salts of weak organic acids such as sodium benzoate, sodium citrate, potassium tartrate and sodium phosphate.

The following specific examples are further illustrative of the nature of the present invention, but the invention is not limited thereto. All amounts and percentages through the specification and in the claims are by weight unless otherwise indicated.

EXAMPLE I

A mouthwash having the following composition is formulated:

|  | Percent by Weight |
|---|---|
| Denatured ethanol | 15.00 |
| Emulsifier* | 4.00 |
| Benzethonium chloride | 0.03 |
| Lemon oil | 0.20 |
| Glycerine | 10.00 |
| Sodium saccharin | 0.04 |
| Color (FD & C Yellow No. 5; 0.01% solution) | 0.60 |
| Deionized water | 70.13 |
|  | 100.00 |

*Polyoxypropylene-polyoxyethylene block polymer in which the polyoxyethylene component is 80% of the molecule and the molecular weight of the polyoxypropylene portion is 1750.

A premix of the emulsifier and lemon oil is prepared by mixing the components with slight heating until the components are melted.

The formula amount of water is added to a mixing tank having agitator means. The glycerine, sodium saccharin and color are added to the mixing tank and agitated. The alcohol and benzethonium chloride is then introduced into the water solution followed by the premix of the emulsifier and lemon oil. The mixture is agitated to intimately mix all ingredients. The resulting formulation is visually clear with a yellow tint, does not separate during prolonged storage and has a refreshing lemon taste.

EXAMPLE II

The formulation of Example I is repeated except that the formula amount of alcohol and benzethonium chloride is incorporated into the premix.

EXAMPLE III

The formulation of Example I is repeated except that the premix is added to the water solution before the alcohol and benzethonium chloride.

EXAMPLES IV – IX

The following mouthwashes having lemon flavors of varying intensities are formulated by the method of Example I:

| Ingredient | Example Number; Percent by Weight | | | | | |
|---|---|---|---|---|---|---|
|  | 4 | 5 | 6 | 7 | 8 | 9 |
| Denatured alcohol (95%)[1] | — | 1.00 | 10.0 | 20.0 | 25.00 | 18.00 |
| Emulsifier[2] | 0.5 | 2.00 | 0.5 | 5.0 | 2.00 | 1.00 |
| Lemon oil | 0.1 | 0.20 | 0.2 | 1.0 | 0.10 | 0.20 |
| Antimicrobial agent[3] | 5.0 | — | 0.5 | 0.8 | 0.50 | 0.05 |
| Glycerine[4] | — | — | 10.0 | 15.0 | — | 15.00 |
| Buffering agent[5] | — | 0.50 | — | 1.0 | — | 0.50 |
| Sweetener[6] | — | — | — | 0.1 | 0.06 | 0.10 |
| Additional flavorant[7] | — | 0.05 | — | 0.1 | — | 0.05 |
| Deionized water | 94.3 | 87.85 | 78.3 | 62.0 | 72.34 | 65.10 |

[1] Ethanol or isopropanol.
[2] Polyoxypropylene-polyoxyethylene block polymers in which the polyoxyethylene component is 80% of the molecular weight of the polyoxypropylene portion is 2750; polyoxypropylene block polymer in which the polyoxyethylene component is 70% of the molecule and the molecular weight of the polyoxypropylene portion is 4000, or a polyoxyethylene condensate of sorbitan monooleate containing about 20 moles of ethylene oxide.
[3] Preferably benzethonium chloride; diisobutyl phenoxyethyoxy ethyl dimethyl benzyl ammonium chloride, N-alkylpyridinium chloride, N-cetyl pyridinium bromide, sodium N-lauroyl sarcosine, sodium N-palmitoyl sarconsine, layroyl sarcosine, N-myristoyl glycine and potassium N-lauroyl sarcosine can also be used.
[4] Sorbitol or propylene glycol can be substituted for glycerine.
[5] Sodium benzoate, sodium citrate, potassium tartrate or sodium phosphate.
[6] Sodium saccharin.
[7] Citric acid.

The formulations of Examples IV–IX are visually clear and stable and have a refreshing lemon flavor.

EXAMPLE X

The formulations of Examples IV–IX are repeated using the method of Example II. The resulting mouthwashes are visually clear, stable and have a distinct lemon flavor.

Although the present invention has been described with reference to particular embodiments and examples, it will be apparent to those skilled in the art that variations and modifications of this invention can be made and equivalents can be substituted therefor without departing from the principles and true spirit of the invention.

We claim:

1. A method of formulating a liquid mouthwash comprising from 0.05 to 1.0% by weight lemon oil, from 1.0 to 5.0% by weight of a lemon oil emulsifier chosen from the group consisting of polymeric polyoxyethylene containing nonionic surface-active agent, from 0 to 25% by weight of an alcohol chosen from the group consisting of isopropanol and ethanol, and from 60 to 95% by weight of water, including the steps of
   a. preparing a premix including said lemon oil, emulsifier and alcohol,
   b. providing a mixing vessel containing said water,
   c. adding said premix to said water containing vessel and,
   d. intimately mixing said premix and said water.

2. The method of claim 1, wherein said alcohol in ethanol.

3. The method of claim 1 wherein said emulsifier is chosen from the group consisting of polyoxypropylene-polyoxyethylene block polymers having the formula $$HO(CH_2CH_2O)_a[CH(CH_3)CH_2O]_b(CH_2CH_2O)_cH$$

wherein $a$, $b$ and $c$ are integers said polyoxyethylene component constituting at least 40% by weight of said polymer and the polyoxypropylene portion of said polymer having a molecular weight from about 1,000 to about 4,000.

* * * * *